(12) United States Patent
Wapples

(10) Patent No.: X9273
(45) Date of Patent: Nov. 30, 1835

(54) SPARK CATCHER

(76) Inventor: James W. Wapples

James W. Waples of Wilmington, State of Delaware

Letters Patent

The schedule referred to in these Letters Patent and making
part of the same containing a description in the words of the
said James W. Waples himself of his improvement in the
spark catcher to be attached to the pipe of a [illegible]
Engine To all persons to whom these presents shall come
James W. Waples of Wilmington in the County of New
=castle and State of Delaware, Engineer sends greeting —
Be it known that I the said James W. Waples, have invented
constructed made and applied to use a new and useful
machine called "Waples Spark catcher" specified in the
words following viz. The machine consists of two principle parts
the catcher A, and receiver B. and is constructed of wire gauze
sheet iron or tin zinc or copper the catcher is of a circular form
and consists of two flanges C&D connected at the bottom forming
a trough E; the inner one is connected by cross bars playing
upon a spindle F closely around the exterior of the top of the
smoke pipe G, — The flanges to be distant from each other from
four to six inches proportional however to the diameter of the pipe
The flanges are to be of the same height until from the point H,
opposite to the centre of the pipe when the outer one is gradually
to taper down in front of to the sixteenth of an inch or thereabouts
leaving an open space I between the wire gauze and that
part of the flange allowing the air to pass freely in without obstruc
tion, at that place, . The wire gauze K is attached to the outer
flanges and from a point opposite the spindle to the front is to
be of a coarser texture than that upon the remainder of the
catcher and the receiver, The bottom sides and end to the height
of the flanges are to be made of tin, sheet iron, copper, or other suitable material. The bottom of the machine to be tapered off gradually until the diameter of the end is about one third of the greatest diameter of the catcher. The height of the [illegible] to be about two thirds of the greatest height of the catcher which is to be about equal to the lateral distance across opposite the centre of the smoke pipe. The receiver is attached to the catcher by a hinge L at the top. —— The operation of the machine is as follows. The machine itself being like a vane will always present its front to the wind. The sparks rising from the smoke pipe and the wire gauze being distant from the upward draft they fall into the space between the flanges and the air blow-ing briskly through the small opening in front and through the coarse gauze transfers or carries them at once into the receiver which retains them until they consume themselves. The whole machine is covered with wire gauze. The cleaning the receiver is effected by a bent lever, M, attached to a hinge N to the bottom of the catcher immediately under the hinge of the receiver the lever being so curved that when the end is drawn [illegible] by a cord or wire O, it throws up the receiver and the sparks, ashes &c then fall out.

What I claim as my invention and which I desire to secure by Letters Patent is the before described spark catcher and receiver and the mode of cleaning the receiver.

Witnesses,

Wm P. Elliot

[illegible] [illegible]

James W. Wapley (Drawing)

Exd

[illegible]